Nov. 30, 1965  R. G. METZNER  3,220,027
BOAT HULL CONSTRUCTIONS
Filed Aug. 17, 1964  6 Sheets—Sheet 6
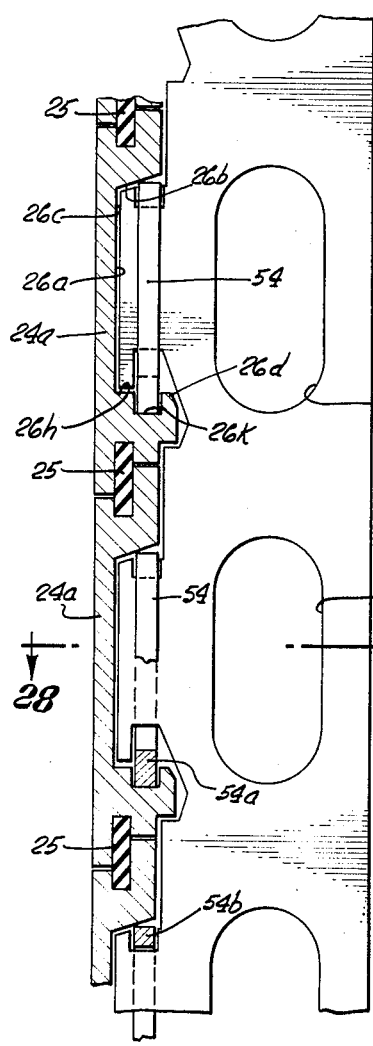
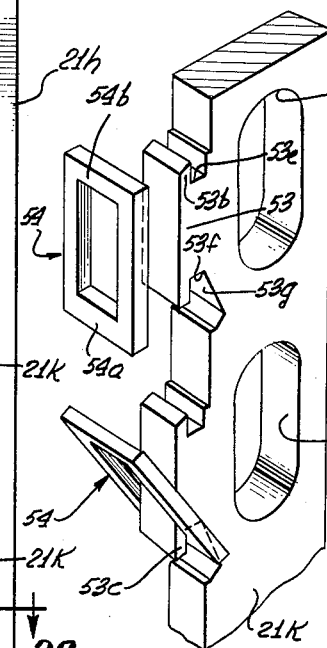
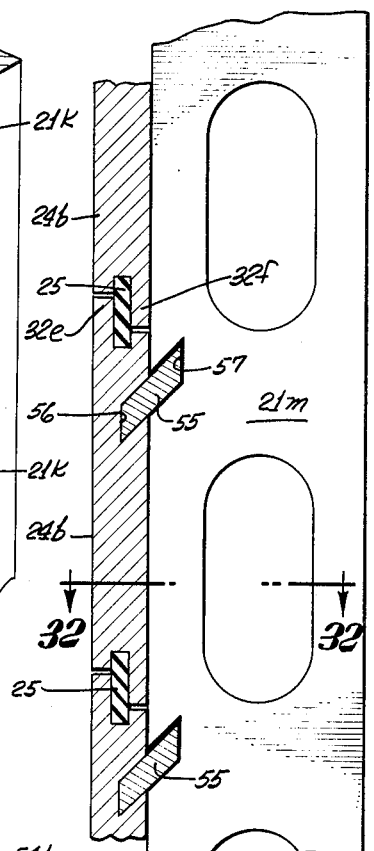
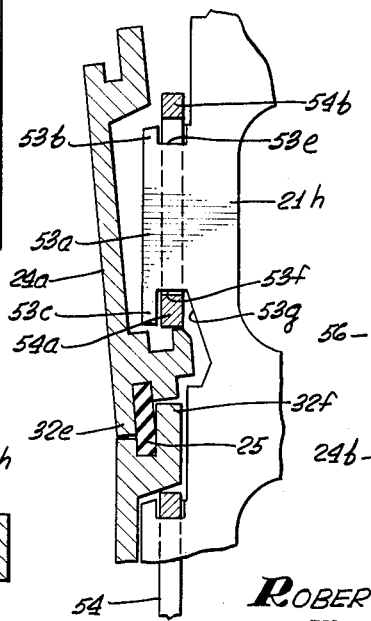
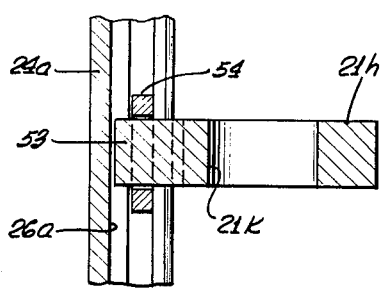
INVENTOR.
ROBERT G. METZNER
BY
Bernard Kriegel
ATTORNEY United States Patent Office 3,220,027
Patented Nov. 30, 1965

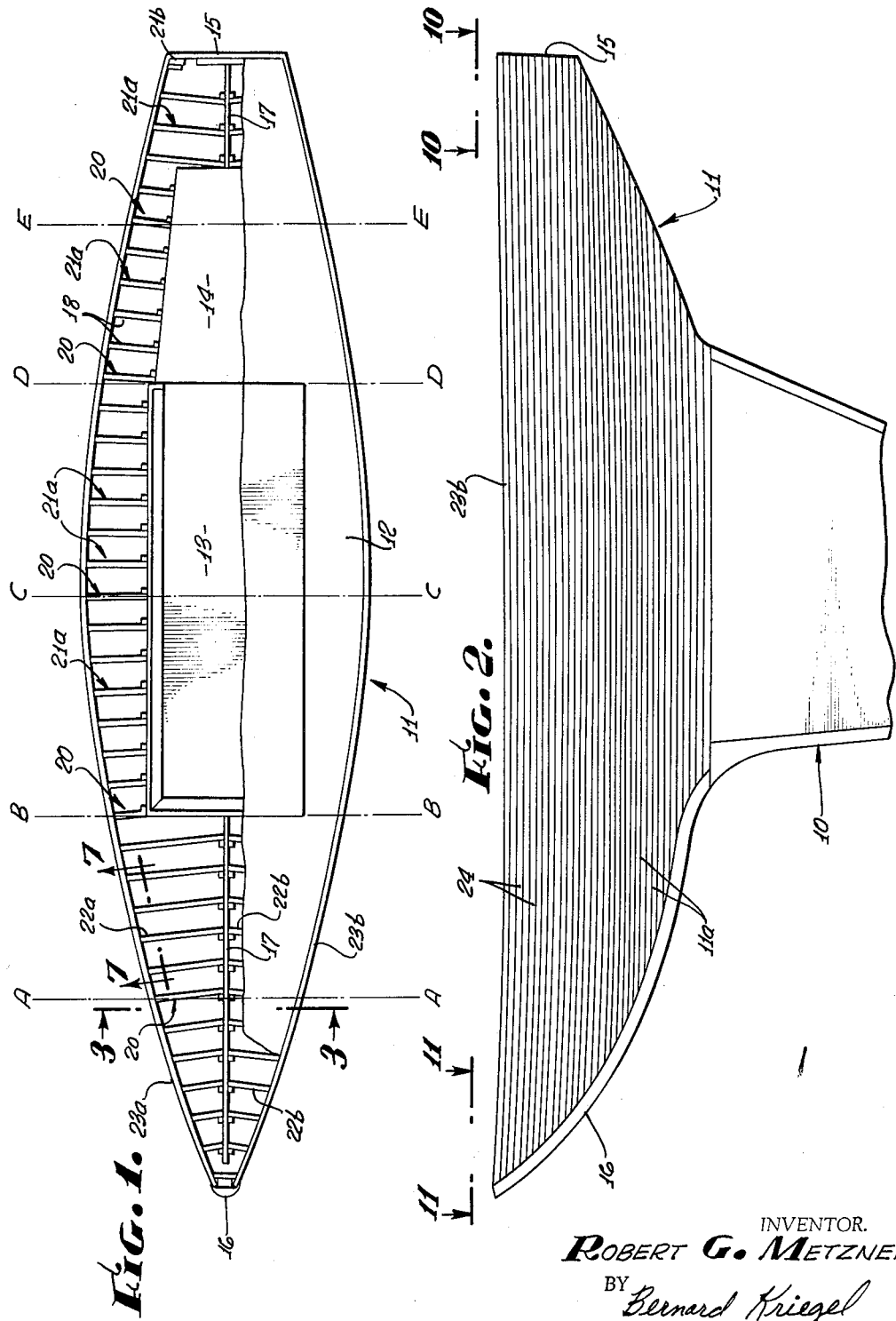

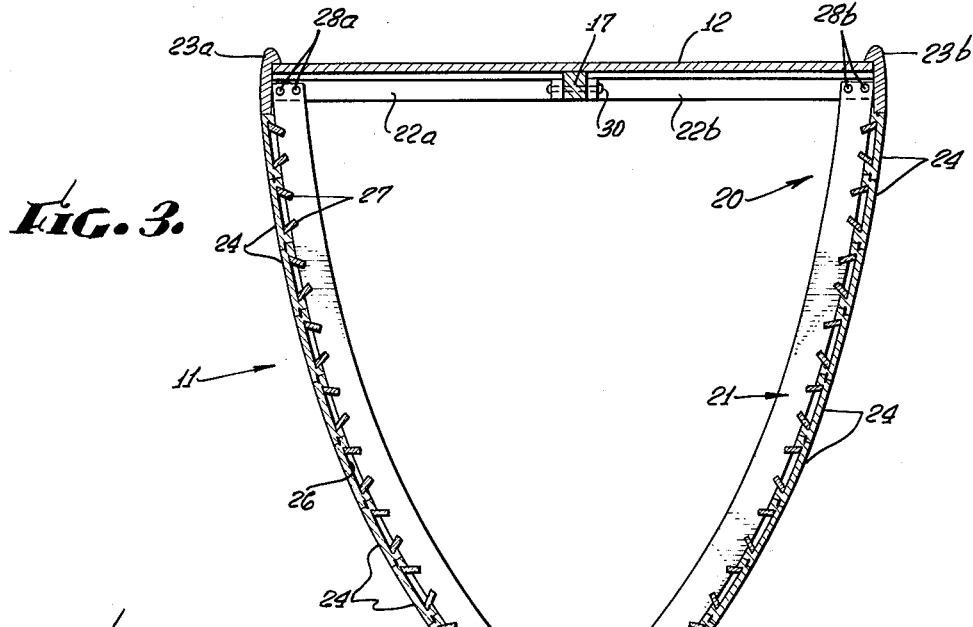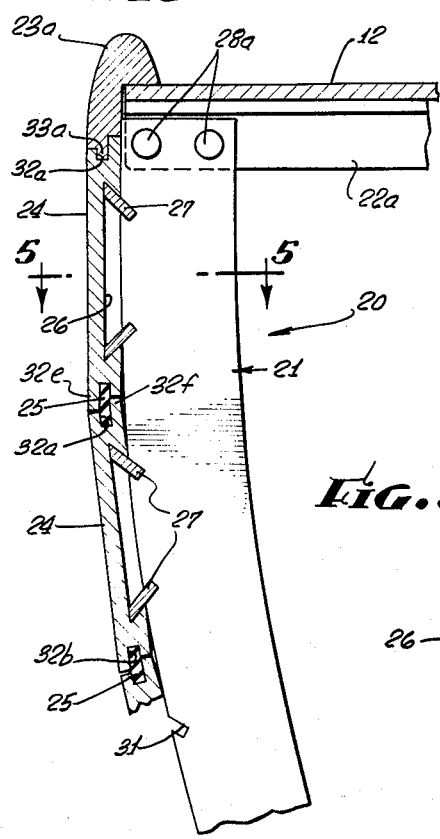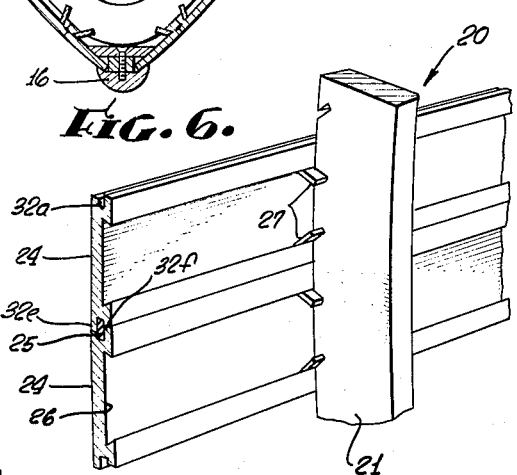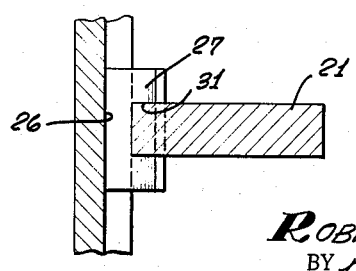

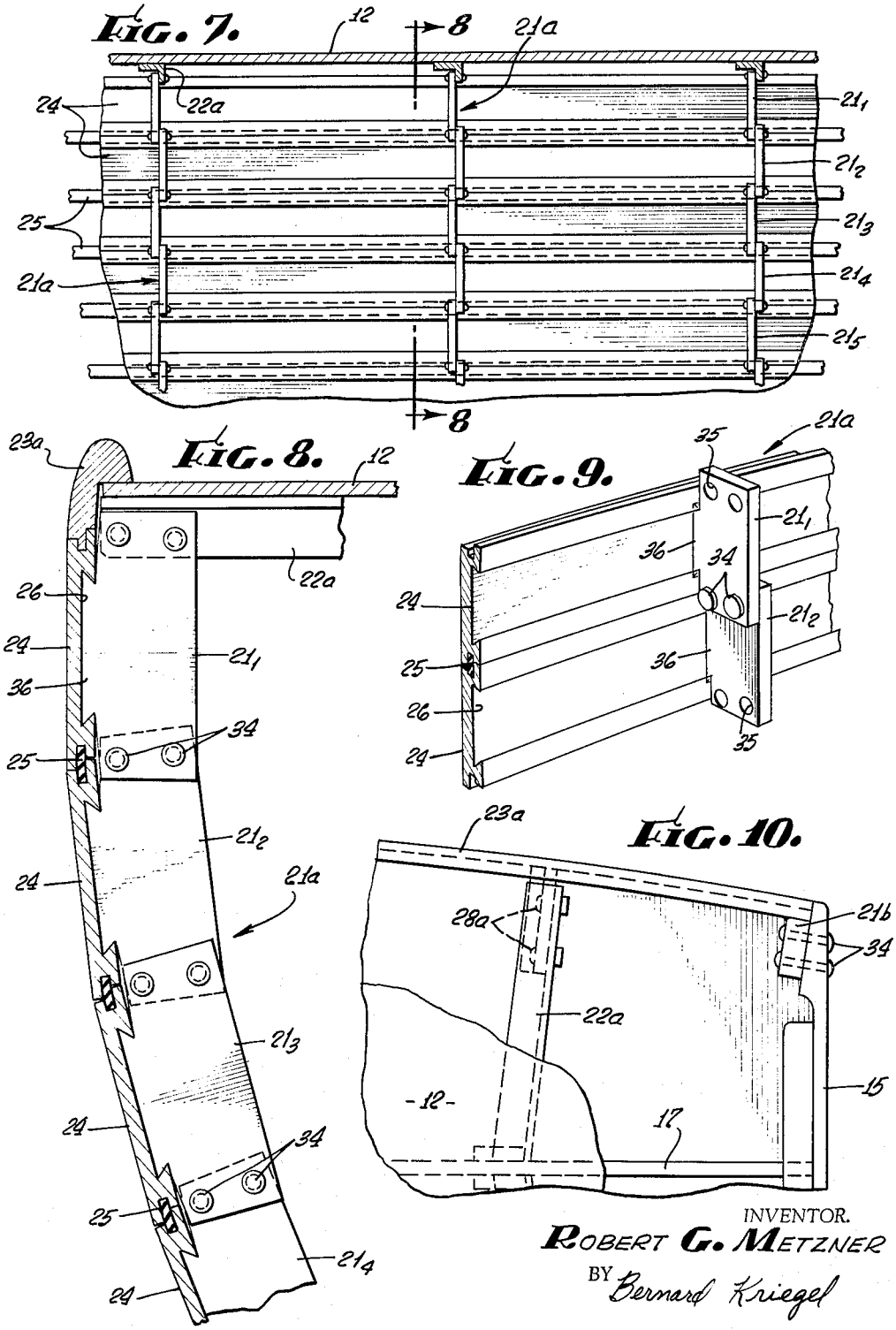

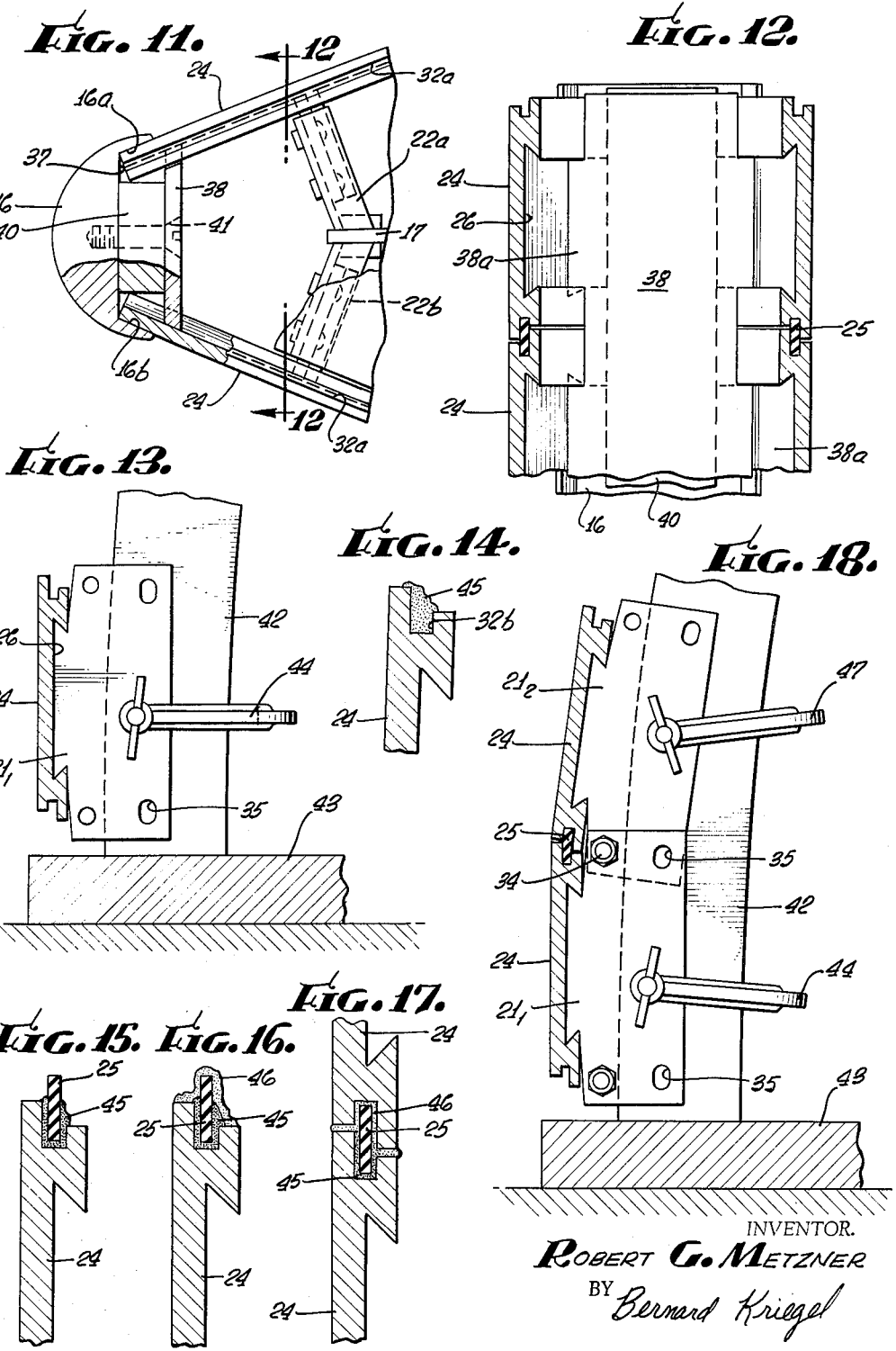

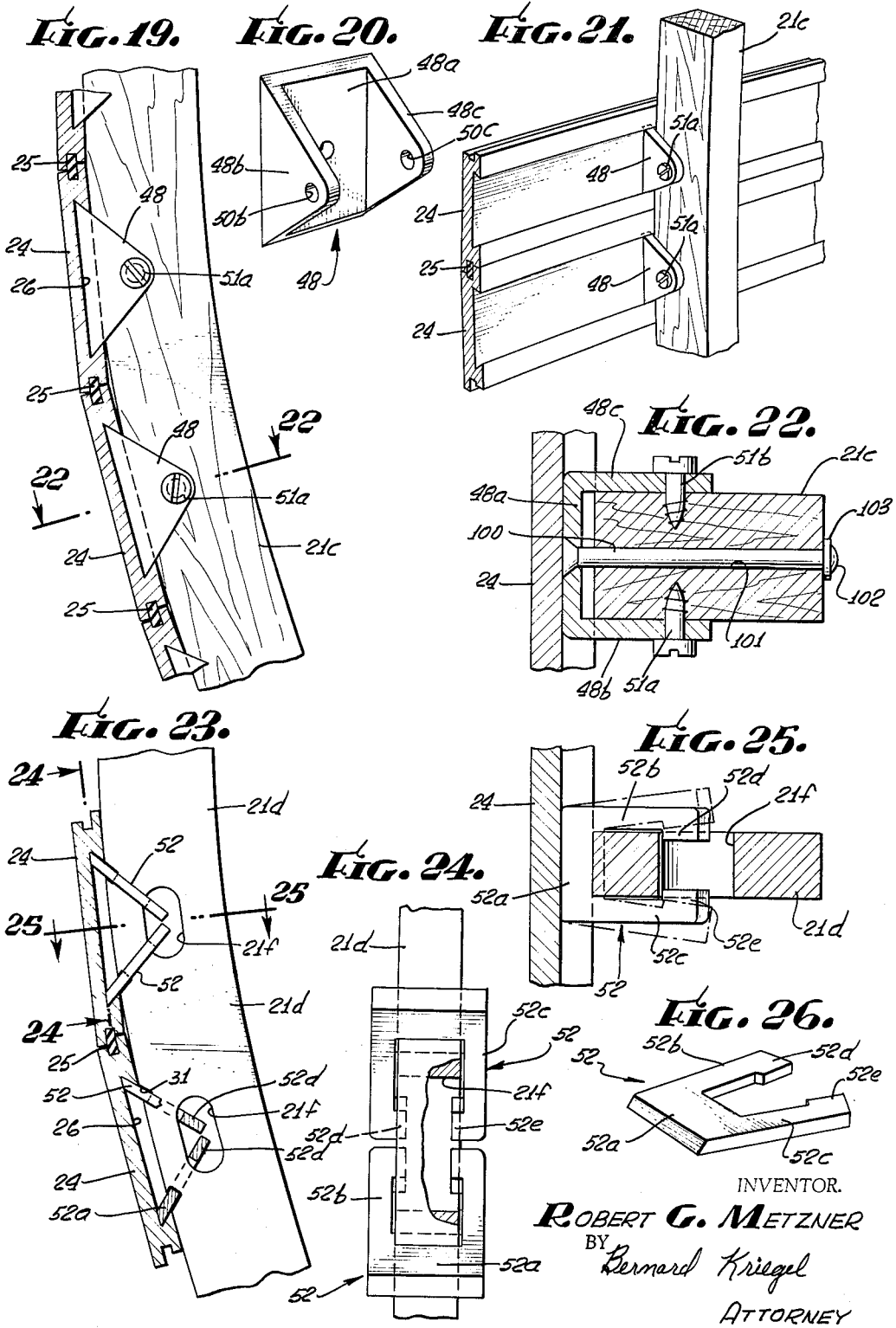

3,220,027
BOAT HULL CONSTRUCTIONS
Robert G. Metzner, 916 N. Foothill Road,
Beverly Hills, Calif.
Filed Aug. 17, 1964, Ser. No. 389,844
20 Claims. (Cl. 9—6)

The present invention relates in general to the boat building art, and more particularly to boat hulls in which planks form the outer shell portions.

Recent innovations in the construction of small boats has been the introduction of fiber glass and aluminum as a hull material. Both have certain advantages over wood, but both are more expensive than conventional wood construction. More specifically, fiber glass is more expensive, heavier and also requires an expensive mold from which many boats of the same design must be made in order to pay for the mold. The aluminum hull is superior in a number of respects over the fiber glass hull, but is even more expensive since the usual way of making aluminum hulls is to form the plates in accordance with the lines of design and then, after forming, weld them together. Another problem of the usual aluminum hull is the difficulty in getting the metal as fair as either the wood hull or the fiber glass hull.

It is, therefore, an object of the present invention to provide boat hull constructions embodying metal planks and capable of ready assembly without the use of expensive molds or forms, and without the necessity for welding parts together.

It is another object of the present invention to provide a few basic building blocks by means of which an entire boat hull may be built.

It is a further object of the present invention to provide a set of prefabricated elements by means of which a metallic boat can be constructed with relatively little difficulty.

The present invention achieves the above-stated objects, and thereby eliminates many of the difficulties and problems encountered in the prior boat-building art, some of which have already been mentioned, by providing uniquely shaped extruded metal planking members that interlock in such manner as to form a continuous watertight hull. These extruded plank members are so constructed as to permit them to be readily secured to formers or frames that are placed at regular intervals, and that form them into the designed shape of the hull without requiring forming tools of any sort to shape them. Moreover, by extending the ends of the interlocking devices so that they overlap, and then rigidly fastening them together, these interlocking devices together constitute a continuous frame member. Consequently, in accordance with the present invention, the conventional frames or stiffening members, which are usually made of steam-bent wood or formed metal, are thereby entirely eliminated, or their numbers reduced considerably.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURE 1 is a top view, with a part broken away, of a boat constructed in accordance with the present invention;

FIG. 2 is a side elevational view of the hull and keel poritons of the FIG. 1 boat;

FIG. 3 is a cross-sectional view taken in the direction of arrows 3—3 on FIG. 1, and illustrating the basic interlocking relationship between the planking members and one of the principal stiffening frames in a preferred embodiment of the invention;

FIG. 4 is an enlarged view of a portion of the apparatus disclosed in FIG. 3;

FIG. 5 is a cross-sectional view of the apparatus taken in the direction of arrows 5—5 on FIG. 4;

FIG. 6 is a perspective view of a portion of the apparatus disclosed in FIG. 4, illustrating the interlocking nature of the frame and plank members;

FIG. 7 is a sectional view on an enlarged scale taken in the direction of arrows 7—7 in FIG. 1, and presents a frontal view of the hull frame construction intermediate the principal supporting frame sections;

FIG. 8 is a cross-sectional view, on an enlarged scale, taken in the direction of arrows 8—8 in FIG. 7, illustrating the hull frame interrelationship at an intermediate point;

FIG. 9 is a perspective view of the intercoupled frame and plank segments of FIGS. 7 and 8;

FIG. 10 is an enlarged top plan view of the transom or rear portion of the boat, taken along the line 10—10 in FIG. 2;

FIG. 11 is a top plan view, on an enlarged scale and partly in section, of the stem or front portion of the boat, taken along the line 11—11 in FIG. 11;

FIG. 12 is a cross-sectional view taken in the direction of arrows 12—12 in FIG. 11;

FIGS. 13 to 18, inclusive, illustrate several successive steps followed in constructing a hull in accordance with the present invention;

FIG. 19 is a vertical section through a portion of a modified form of boat hull structure;

FIG. 20 is an isometric projection of one of the frame connector members shown in FIG. 19;

FIG. 21 is an isometric projection of the apparatus illustrated in FIG. 19;

FIG. 22 is a cross-section on an enlarged scale taken along the line 22—22 on FIG. 19;

FIG. 23 is a vertical section through a portion of another form of boat hull structure;

FIG. 24 is a side elevational view on an enlarged scale of the structure disclosed in FIG. 23, with the planking removed;

FIG. 25 is a cross-section on an enlarged scale taken along the line 25—25 on FIG. 23;

FIG. 26 is an isometric view of one of the connector rings forming part of the structure disclosed in FIGS. 23 to 25;

FIG. 27 is a fragmentary vertical section through still another form of boat hull;

FIG. 28 is a cross-section taken along the line 28—28 on FIG. 27;

FIG. 29 is an isometric projection disclosing a step in the assembly of the boat structure illustrated in FIG. 27;

FIG. 30 is a vertical section disclosing a further step in the assembly of the boat structure shown in FIG. 27;

FIG. 31 is a vertical section through a portion of yet another embodiment of the invention;

FIG. 32 is a cross-section taken along the line 32—32 on FIG. 31.

Considering now the drawings wherein like parts or elements are similarly designated throughout the several figures, reference is made to FIGURES 1 through 12 wherein a first embodiment of the invention is illustrated. Referring initially to FIGS. 1 and 2, the major portions of a boat constructed in accordance with the present invention are presented therein. In these figures, the fin keel of the boat is designated 10 and the boat's hull is generally designated 11, the lines therein, designated 11a, representing the boundaries or lines of demarcation between the various members or elements used in the assembly or construction of the hull, as will be explained later. Also shown in the figures are the boat deck 12, the cabin area 13 and the cockpit area 14. At the very rear of the boat is the transom 15 and at the front end of the boat is the stem part of the keel 16, a central stringer 17 running lengthwise of the boat between the transom and the stem. Between the transom and the stem and mechanically linked or coupled to both the hull and the aforesaid central stringer are a plurality of supporting frames 18, the primary one being positioned at stations or areas A, B, C, D and E. These principal or primary frame members may be identical with one another except for their dimensions or size, which, as may be seen from the FIG. 1, is due to the changing width and contour of the boat.

A primary frame member of the kind that may be found at any one of positions A to E, generally designated 20, is illustrated in FIG. 3 and is shown to include a generally U-shaped frame 21 and a pair of L-shaped cross-members 22a and 22b respectively mounted between the ends of frame 21 and central stringer 17. Decking 12 is mounted over and is suitably secured to cross members 22a, 22b, and is enclosed at its sides by means of cap rail elements 23a and 23b.

Mounted on the outside of frame 21 are a plurality of plank members 24 which, when linked together, extend over the full peripheral length of the frame and ultimately link with cap rails 23a, 23b. The manner in which plank members 24 are linked together and the manner in which they are mounted and held in place on frame 21 will be shown and described in greater detail below. Suffice it to say at this point, therefore, that it involves caulking strips 25, inner dovetailed grooves 26 and wedge or connector elements 27. Returning to cross-members 22a, 22b, each is fitted between central stringer 17 and an end of frame 21, where the cross-members are mechanically tied to the frame by means of rivets or bolts 28a, 28b. The same cross-members are rigidly coupled to each other through the central stringer 17 by means of a rivet or bolt 30. The lower portions of the frame are also suitably secured to the keel 16.

An enlarged view of an end portion of frame member 20 is presented in FIG. 4 to which reference is now made. As may be seen from this figure, frame 21 is formed with a large number of grooves or notches 31 spaced along its periphery or outside surface, and these grooves or notches 31 are arranged in outwardly diverging pairs, with one groove or notch in each pair opening upwardly and the other opening downwardly from the horizontal. As may also be seen from FIG. 4, there are as many plank members 24 as there are such pairs of grooves or notches 31, with each plank member overlying a pair of these grooves or notches in such a way that its dovetailed groove 26 is in alignment with them. Wedge or connector elements 27 are fitted snugly into grooves or notches 31 and extend from the frame 21 and into the dovetailed portions of grooves 26, firmly engaging the sides of each groove 26, as well as the bottom of the groove, securing the plank members against and to the frame 21. It is to be noted that the inclined or divergent sides of each groove 26, in effect, form continuations of the outer sides of the grooves 31 to insure snug coengagement of the parts.

Each plank member has a groove 32a at its top and another groove 32b at its bottom, the top groove of one plank member being aligned or registered with the bottom groove of an adjacent plank member to form a rectangular chamber into which the caulking strip 25 is received. A lower outer flange or lip 32e of an upper plank overlies an upper inner flange or lip 32f of an adjacent lower plank, so that the lower portion of an upper plank assists in retaining the upper portion of a plank therebelow inwardly and in engagement with the frame member 21. The caulking strip 25 is bonded to the planking members by a suitable adhesive, such as an epoxy resin, the bonding material also being disposed between the opposed top and bottom of adjacent members, to form a leakproof joint therebetween.

The plank members are progressively secured to the frame 21 from the upper portion of the frame at one side to its upper portion at the opposite sides. After the decking 12 has been placed upon and attached to the cross-members 22a, 22b, the cap rails 23a, 23b are mounted on the decking, with a depending rail tongue 33a received within an upper groove 32a of an associated plank 24 therebelow, an epoxy or similar resin bonding each rail to the plank therebelow.

A perspective view of a portion of a hull constructed in accordance with the present invention is shown in FIG. 6, which more clearly illustrates the cooperative relationship between the various aforementioned members. As indicated in FIG. 6, caulking strips 25 extend for the full length of planking members 24 and, although not absolutely essential, it is preferred that wedge or connector elements 27 extend beyond the opposed sides of frame 21. This last feature is demonstrated in the cross-sectional view of FIG. 5. Thus, each connector element 27 can be inserted in groove 26 and then moved lengthwise of the plank 24 into a companion frame groove 31.

The one-piece primary frame member construction 20 is used at each of the principal stations or positions A–E, the only difference between them being one of size brought about by the varying width of the boat from stem to stern. The shape of the boat is determined by the frame members 20 and by the transom 15 and bow 16 configurations.

Between the primary frame members and forwardly and rearwardly of the transom and stem, longitudinally spaced, intermediate or secondary frame members 21a are employed whose constituent elements are assembled together and to the planks 24 in the manner shown in FIGS. 7, 8 and 9. By referring to these figures, it will be noted that the planking members 24, caulking strips 25, and cap rails 23a, 23b bear the same relation to one another as described above in connection with the one-piece frame members 21. However, in lieu of a solid frame 21, the secondary frame members are composed of frame segments $21_1$, $21_2$, $21_3$ ... $21_n$ secured together by rivets or bolts 34 to form a composite rigid chain having the desired frame shape. With respect to each segment of frame 21a, it will be noted that it is rectangular shaped and has openings or holes 35 at the top and bottom through which the rivets or bolts 34 pass. Each frame segment also includes a dovetailed tongue 36 integral with and extending from the body portion of the segment, this dovetailed tongue conforming in shape and size to dovetailed groove 26 of each plank member 24.

In fabricating frame 21a, dovetailed tongues 36 of frame segments $21_1$–$21_n$ are respectively fitted into dovetailed grooves 26 of plank members 24, and, by so doing, the frame segments are caused to overlap at their ends in such manner that holes 35 of adjacent segments are in registration with each other, alternate segments being in transverse or vertical alignment. The frame segments are then permanently and rigidly fixed to each other by means of the bolts or rivets 34, to provide the desired frame structure 21a. It should be mentioned that by providing dovetailed flanges 36 as an inherent part of the secondary frame segments 21a, the need for wedges or connector elements 27 of the kind previously discussed in connection with FIGS. 3–7 is eliminated. However, it should be recognized that, as an alternative, the frame segments of FIGS. 7–9 may be made without dovetailed tongues 36 extending from them, in which case it would be necessary to provide these frame segments with grooves or notches 31, or the like, and to also provide the aforesaid wedges or connector elements 27. Thus, by providing the frame segments with the integral dovetailed tongues, construction is very greatly expedited and facilitated. Finally, it should be briefly mentioned that cross-members 22a, 22b are mounted and connected to the frame 21a in the same manner as they are connected to the integral frames 21.

In FIGS. 10 and 11, the construction of the stern and stem portions of the boat is shown in detail. More particularly, in FIG. 11, the forward ends of the planks 24 are received within the stem or keel 16, the exterior of which may be convexly shaped. The stem 16 has a cavity 37 that opens inwardly, the ends of the plank 24 being inserted in this cavity and clamped against the opposed cap walls 16a, 16b by a clamp strip 38 and a spacing bar 40 positioned between the keel and the clamp strip. Screws 41 pass through the strip or plate 38 and bar 40, being threaded into the stem. When tightened, the screws 41 clamp the end portions of the planks 24 between the walls 16a, 16b and the strip 38. Cap walls 16a and 16b are preferably formed to lie substantially parallel to the ends of the planks 24.

Another view of the ship's stem taken in the direction of arrows 12—12 in FIG. 11 is presented in FIG. 12 wherein the special configuration of clamping strip 38 is more clearly shown. More specifically, the clamping strip is generally rectangular-shaped and, along either side or edge thereof, has a plurality of dovetailed tongues 38a fitting into the dovetailed grooves 26 of the plank members 24 that constitute the hull 11. As disclosed in FIG. 11, the forward end of central stringer 17 terminates short of the strip 38, the frames 21a and the cross-members 22a, 22b meeting the central stringer at a substantial angle to permit these elements to orthogonally meet the planks and provide maximum support thereto.

At the aft part of the boat (FIG. 10), the transom 15 is shaped to enclose and seal the rear ends of the planks 24, being secured by rivets or bolts 34 to a rear frame 21b connected to the planks 24.

The hull of the boat can be constructed as described above in connection with the use of primary integral frame members 21 and articulated secondary frame members 21a. If desired, all frame members between the stem and stern can be of the segmented type 21a, the frame shapes at suitable intervals along the hull, as at the intervals A to E, being provided by a pattern or form 42 that functions as a guide in assembling the segments 21₁ to 21ₙ to one another and to the planks 24. One technique for assembling a complete, articulated frame 21a is described in FIGS. 13 to 18, inclusive.

A frame pattern 42 is mounted in inverted fashion on a supporting base 43, the frame pattern having the configuration desired for the frame section to be constructed for the boat. The tongue 36 of the first frame segment 21₁ is slipped into a groove 26 of a plank 24 and the segment secured to the frame pattern 42, as by means of a C-clamp 44. The first frame segment at each other frame pattern along the length of the boat is similarly connected to the plank 24 and is clamped to its pattern. As shown in FIG. 14, an epoxy resin adhesive 45, or other suitable adhesive, is then placed in the groove 32b, followed by a caulking and connector strip 25 (FIG. 15), upon which is placed additional resin adhesive material 46 (FIG. 16).

The second frame segment 21₂ for each frame section is then mounted in the next planking 24, the latter then being fitted over the strip 25 and being moved toward the plank therebelow until the outer bottom hole 35 of the frame segment 21₂ is in registry with the outer top holes 35 of frame segment 21₁ (FIG. 17). A rivet or bolt 34 is then inserted in the registering outer holes and the segment 21₂ moved inwardly toward the form 42 so that the second plank 24 conforms substantially to its curvature, whereupon the segment 21₂ is secured to the form 42 by a C-clamp 47 (FIG. 18). The foregoing procedure is then repeated with successive planks and segments around the entire outer surface of each of the forms 42. The clamps and forms 42 are then removed and bolts 34 inserted through the inner holes 35 to rigidly secure the segments together, providing the structure shown in FIGS. 8 and 9. To insure conformance of the planks 24 to the shape of the forms 42, the inner holes 35 are elongated to permit a segment to rock or tilt about the axis of an outer bolt with respect to an adjacent segment, after which a bolt 35 can be inserted through the aligned inner holes and tightened. When all of the articulated frame sections have been assembled, the assembly is turned to an upright position and the central stringer 17, cross members 22a, 22b, cabin area frame 13, cockpit area frame 14, and decking 12 are assembled in the manner shown and described herein. The cap rails 23a, 23b are then placed in overlapping relation to the margins of the deck, with their tongues 33a cemented in the grooves 32a. To complete the hull, the transom 15 and keel 16 are mounted thereon.

The boat construction described above makes it possible to obtain many of the parts from metal extrusions, such as aluminum extrusions, of the desired configurations. Thus, the planks 24 may be an aluminum extrusion, cut to the required lengths; whereas the connector elements 27 and segments 21 may be constituted initially as elongate extrusions, which are cut to the required lengths or thickness.

In lieu of aluminum frames, wood frames 21c may be used, as in the form of invention disclosed in FIGS. 19 to 22, inclusive. The frames are of the required shapes along the length of the hull to provide a finished hull of the desired configuration. The planks 24 are the same as in the previously described embodiment, being secured to the frames 21c by saddle-shaped connecting members 48. Each member 48 includes a base 48a and a pair of arms 48b and 48c extending at right angles to the base, the spacing between the arms being substantially equal to the thickness of the wood frame 21c. The base of each bracket has a height conforming to the height of the base of a plank groove 26, and its upper and lower edges are inclined to conform to the divergent sides of the groove 26. Bracket arms 48b and 48c have holes 50b and 50c through them, and when the frame is fitted between the arms, as shown in FIGS. 21 and 22, appropriate screws 51a and 51b are inserted in the holes and then screwed into the wood to rigidly mount the bracket on the frame. The members 48 are slipped into the dovetailed grooves 26 of the planks 24, the arms 48b, 48c being disposed on opposite sides of the frame 21c and the planks appropriately interlocked and overlapped with respect to each other. A bolt or rivet 100, suitably secured to the base 48a of each connecting member 48, extends through a lateral hole 101 in the frame 21c, the inner head 102 of the rivet being flared outwardly against a washer 103 bearing against the wood frame to draw the planks snugly against the frame 21c. Screws 51a, 51b may then be inserted through holes 50b, 50c in the arms 48b, 48c and threaded into the wood frame to firmly secure each member 48 thereto. Arms 48b and 48c may be eliminated where necessary to permit the base 48a to be set at an angle to the frame where planking is not perpendicular thereto.

Another embodiment of frame 21d and connector member 52 is disclosed in FIGS. 23–26 for coaction with the planks 24. As illustrated in FIG. 23, the frame 21d has the desired shape, being an integral unit with a plurality of elongated openings 21f through it, with which generally C-shaped clamps or connector members 52 are linked for the purpose of rigidly holding the frame 21d and the plank members 24 of the hull 11 together. Such C-shaped clamp or ring 52 is illustrated in FIG. 26 in its initial condition, its base 52a being angled to fit into a corner of the dovetailed groove 26 in any one of the plank members. In addition, the ring 52 includes a pair of spaced divergent arms 52b, 52c extending from the base and merging into opposed fingers 52d, 52e extending toward each other.

In connecting the plank members 24 to the frame, a pair of oppositely inclined rings 52 are disposed over the frame 21d, the diverging arms of each ring straddling the frame with its fingers 52, 52e spaced apart. The base portions of a pair of oppositely directed connector members are disposed appropriately in a plank groove 26 at opposite sides thereof and the plank moved inwardly toward the frame so that the base portions can move into the divergent frame slots or notches 31, whereupon the arms 52b, 52c of each ring are deflected or bent inwardly to embrace the sides of the frame and to dispose the fingers in the opening 21f, as shown in FIGS. 23 and 25. The fingers engage the outer side of the opening 21f, holding the plank snugly against the exterior of the frame 21d and in appropriate coupled and sealed relation to a plank therebelow.

The foregoing mode of assembly is repeated for additional planks and at additional locations at which the frames 21 are located along the length of the boat.

An additional modified form of the invention is illustrated in FIGS. 27 to 30, inclusive, wherein the planks, frames, and the means for linking the frames to the planking members are specifically different from the corresponding members previously described. Each frame 21h has T-shaped tongues 53 integral thereto and extending laterally outwardly, the tongues corresponding in number and spacing to the planks 24a to be mounted on the frame. Each head 53a of the tongue is rectangular-shaped, with an upper portion 53b shorter than its lower portion 53c. The upper portion 53b provides an upper groove 53e with the main body of the frame, the lower portion 53c defining a deeper lower groove 53f with the body of the frame, the inner side 53g of this last-mentioned groove inclining inwardly and downwardly to provide an enlarged recess. For the purpose of reducing the weight of the frame 21h and a saving of material, it may have elongated openings 21k through it.

The planking members 24a are modified somewhat, particularly in the shape of their inner grooves 26a. As illustrated, the upper side 26b of each groove 26a is inclined to the groove base 26c at an obtuse angle. The lower side 26h of the groove is normal to the base 26c, a groove or channel 26k depending therefrom, the plank having an enlarged portion 26d extending laterally inwardly from the channel 26k. The remainder of each planking 24a is essentially the same as in the other forms of the invention.

The annular or retaining rings 54 are rectangular in shape, the width of its opening conforming to the thickness of the head 53a, and the height of its opening being less than the overall maximum vertical height of the head, the height of the latter being slightly less than the height of the groove base 26c. The lower side 54a of the coupling ring has a height substantially greater than the depth of the plank groove 26k.

In mounting planking members 24a on the frame 21h, a retaining ring 54 is placed around each T-shaped tongue 53, the lower side 54a being first slipped into the groove 53f, as shown in the lower portion of FIG. 29, and the ring then swung inwardly to the position shown in FIG. 30 in which the upper side 54b of the ring is aligned with the upper head groove 53e. With the retaining ring 54 so mounted on the tongue 53, the lower portion of a plank 24a is fitted over a connecting strip 25 with its enlarged portion 26d under the ring side 54e, as disclosed in FIG. 30, the plank inclining outwardly. The upper end of the plank is then moved inwardly toward the frame 21h to align its groove 26k with the ring 54, allowing the lower side 54a of the ring to shift downwardly into the plank groove 26k. Upon full inward movement of the upper end of the plank, its inclined upper groove side 26b engages the upper end 54b of the ring to hold it in its downward position, the lower ring side 54a being held in the plank groove 26k and being overlapped by the lower portion 53c of the T-shaped head, as shown in FIG. 27. By virtue of this relationship, the lower portion of a plank is held inwardly of the frame, and the connector strip 25 and the overlapping relation of its lower flange 32e with an upper flange 32f of a lower plank hold the upper end of the lower plank inwardly of the frame. Thus, the planks 24a mutually secure one another to the frame 21h.

A further modification of the frame and planking members, and the manner in which they are secured to each other, is shown in FIGS. 31 and 32, wherein the frame 21m and planking members 24b are locked to each other by connecting strips or wedges 55 that fit snugly into aligned grooves or notches 26 in the upper portion of the planking members and grooves or notches 57 in the frame. The wedges and confronting grooves 56, 57 are inclined to the plane of their associated plank to secure its upper portion to and inwardly against the frame. The overlapping of an upper flange 32e of a plank with respect to a lower flange 32f of an adjacent plank retains the lower portion of the latter inwardly against the frame. In this manner, the planks mutually hold one another against the frame 21m.

I claim:

1. A boat hull comprising: plank members including means to interlock them to form a continuous watertight hull, each plank member having an inner groove extending lengthwise thereof; a plurality of frames for supporting said plank members and shaping them to provide the desired hull shape; and connecting means extending into said grooves for rigidly mounting said plank members to said frames.

2. Prefabricated apparatus for constructing the hull of a boat around its skeleton framework, said apparatus comprising: a plurality of plank members having inner grooves extending lengthwise thereof; means for interlocking adjacent plank members to each other; and separate connector elements adapted to be disposed in said grooves for rigid connection to said plank members and to the framework.

3. A boat hull comprising: plank members including means to interlock them to form a continuous watertight hull, each plank member having an inner groove extending lengthwise thereof; a plurality of frames for supporting said plank members and shaping them to provide the desired hull shape; connector elements extending into said grooves for rigidly mounting said plank members to said frames; a transom mounted on the rear ends of the plank members to seal the stern of the hull; and a keel assembly mounted on the forward ends of the plank members to seal the front of the hull, said assembly including a keel having a cavity, and means for interlocking the forward ends of said plank members in said cavity in a watertight manner.

4. A boat hull as defined in claim 3: wherein said interlocking means includes a clamping strip mounted between and engaging said plank members; a spacer bar disposed between said keel and clamping strip and positioned in the cavity of said keel; and means for securing said strip to said keel to clamp the forward portions between said clamping strip, spacer bar and the wall of said keel cavity.

5. A boat hull comprising: a plurality of frames for supporting and shaping the hull; a plurality of plank members in sealed relation to one another and having dovetailed grooves extending lengthwise of their inner sides; and connecting means in said dovetailed grooves and secured to said frames to rigidly affix said plank members to said frames and to shape them in the desired hull design.

6. A boat hull as defined in claim 5: wherein said connecting means includes notches in said frames in alignment with the dovetailed grooves of said plank members, and wedges in said notches and dovetailed grooves.

7. In a boat hull as defined in claim 5: wherein said connecting means includes dovetailed tongues integral with and extending from said frames snugly received in the dovetailed grooves of said plank members.

8. In a boat hull as defined in claim 5: wherein said connecting means includes C-shaped brackets having arms secured to and embracing the frames therebetween, and also having bases in the dovetailed grooves of said plank members.

9. In a boat hull as defined in claim 5: a transom on the rear ends of the plank members to seal the stern of the hull; and a stem assembly secured to the forward ends of the plank members to seal the forward end of the hull.

10. A boat hull comprising: a plurality of plank members having grooves along their top and bottom edges; a caulking strip in the grooves of adjacent pairs of plank members and sealed therein; each of said plank members having an inner dovetailed groove extending lengthwise thereof; a framework of both primary and secondary U-shaped frames for supporting and shaping said plank members in the desired hull design, said primary frames having notches therein aligned with said dovetailed grooves, said secondary frames comprising segments rigidly secured to one another, said segments including dovetailed tongues extending therefrom into said dovetailed grooves to rigidly mount said plank members thereon; wedges in said dovetailed grooves and said aligned notches to rigidly connect said plank members to said primary frames; a transom mounted on the rear ends of the plank members to enclose and seal the stern of the hull; and a keel assembly mounted on the forward ends of said plank members to seal the front of the hull, said assembly including a keel having a cavity therein receiving said plank members, a clamping strip engaging the inner sides of said plank members, and means for clamping the forward ends of said plank members between said clamping strip and the walls of said keel cavity.

11. In a boat hull as defined in claim 10: a central stringer extending lengthwise of the hull; cross-members between and secured to said central stringer and said frames; a deck carried by said cross-members and extending to the plank members; and cap rails disposed over the margins of said deck and attached to the uppermost plank members of the hull.

12. A boat hull comprising: a plurality of plank members having grooves along their top and bottom edges; a caulking strip in the grooves of adjacent pairs of plank members and sealed therein; each of said plank members having an inner dovetailed groove extending lengthwise thereof; a framework of both primary and secondary U-shaped frames for supporting and shaping said plank members in the desired hull design, said secondary frames comprising segments rigidly secured to one another, said segments including dovetailed tongues extending therefrom into said dovetailed grooves to rigidly mount said plank members thereon; a plurality of C-shaped connector members having arms rigidly secured to said primary frames, the bases of said connector members being angled at their outer edges for snug reception in said dovetailed grooves to rigidly mount said plank members on said primary frames; a transom mounted on the rear ends of the plank members to enclose and seal the stern of the hull; and a keel assembly mounted on the forward ends of the plank members to seal the front of the hull, said assembly including a keel having a cavity therein receiving said plank members, a clamping strip mounted between the plank members, a spacer disposed between said keel and clamping strip, and means for clamping the forward ends of said plank members between said clamping strip and the wall of said keel cavity.

13. In a boat hull as defined in claim 12: a central stringer extending lengthwise of the hull; cross-members between and secured to said central stringer and said frames; a deck mounted on said cross-members and extending to the plank member; and cap rails overlying the margins of said deck and attached to the uppermost plank members of the hull.

14. A boat hull comprising: a plurality of plank members having grooves along their top and bottom edges; a caulking strip in the grooves of adjacent pairs of plank members and sealed therein; each of said plank members having an inner dovetailed groove extending lengthwise thereof; a framework of both primary and secondary U-shaped frames for supporting and shaping said plank members in the desired hull design, said primary frames having openings therethrough, said secondary frames comprising segments rigidly secured to one another, said segments including dovetailed tongues extending therefrom into said dovetailed grooves to rigidly mount said plank members thereon; a plurality of generally C-shaped rings each having opposed arms straddling a primary frame and fingers at the ends of said arms confronting each other and disposed in an opening, the base of each ring having an outer inclined end to enable said base to fit snugly in an associated dovetailed groove, a pair of said C-shaped rings being mounted in each dovetailed groove to securely fasten said plank member thereon; a transom mounted on the rear ends of the plank members to enclose and seal the stern of the hull; and a keel assembly mounted on the forward ends of the plank members to seal the front of the hull, said assembly including a keel having a cavity therein, a clamping strip mounted between and engaging the plank members, a spacer bar disposed between said keel and clamping strip, and means for clamping the forward ends of said plank members between said clamping strip and the wall of said keel cavity.

15. In a boat hull as defined in claim 14: a central stringer extending lengthwise of the hull; cross-members between and secured to said central stringer and said frames; a deck mounted on said cross-members and extending to the plank members; and cap rails overlying the margins of said deck and attached to the uppermost plank members of the hull.

16. A boat hull comprising: a plurality of plank members having grooves along their top and bottom edges; a caulking strip in the grooves of adjacent pairs of plank members and sealed therein; each of said plank members having notches in one side thereof inclined to the plane of its plank member; a framework of U-shaped frames for supporting and shaping said plank members in the desired hull design, said frames having inclined notches aligned with the notches of said plank members; connector members in the aligned notches of said plank members and frames to rigidly mount the former on the latter; a transom mounted on the rear ends of the plank members to enclose and seal the stern of the hull; and a keel assembly mounted on the forward ends of the plank members to seal the front and bottom of the hull.

17. In a boat hull as defined in claim 16: a stringer extending lengthwise of the hull; cross-members between and secured to said stringer and said frames; a deck mounted on said cross-members and extending to the plank members; and cap rails overlying the margins of said deck and attached to the uppermost plank members of the hull.

18. A boat hull comprising: a plurality of plank members having grooves along their top and bottom edges; a caulking strip in the grooves of adjacent pairs of plank members and sealed therein; each of said plank members having an inner groove extending lengthwise therein and a coupling recess in a side of said inner groove; a framework of U-shaped frames for supporting and shaping said plank members in the desired hull design, said frames having a main body portion and T-shaped tongues extending therefrom into said inner grooves, said tongues having head portions spaced from said body portions to provide upper and lower coupling grooves therebetween; rings encircling said tongues and disposed in said coupling grooves and in said coupling recesses to attach said plank members to said frames.

19. In a boat hull as defined in claim 18: a stringer extending lengthwise of the hull; cross-members between and secured to said stringer and said frames; a deck on said cross-members and extending to the plank members; and cap rails overlying the margins of said deck and attached to the uppermost plank members of the hull.

20. A boat hull comprising: plank members in sealed relation to each other to form a continuous watertight hull, each plank member having an inner groove extending lengthwise thereof; a plurality of frames for supporting said plank members and shaping them to the desired hull shape; connecting means extending into said grooves for rigidly securing said plank members to said frames; a transom mounted on the rear ends of the plank members to enclose and seal the stern of the hull; a keel assembly mounted on the forward ends of the plank members to seal the front and bottom of the hull; a stringer extending lengthwise of the hull; cross-members between and secured to said stringer and said frames; a deck on said cross-members and extending to the plank members; and cap rails overlying the margins of said deck and attached to the uppermost plank members of the hull.

References Cited by the Examiner
UNITED STATES PATENTS

| Number | Date | Name | Class |
|---|---|---|---|
| 356,096 | 1/1887 | Bowdish et al. | 20—92 |
| 1,272,131 | 7/1918 | Silberg | 20—92 |
| 2,053,843 | 9/1936 | Rossi | 50—420 |
| 2,397,049 | 3/1946 | Sandison | 114—82 |
| 2,503,603 | 4/1950 | Wiley | 114—85 |
| 2,697,235 | 12/1954 | Gronli et al. | 9—6 |
| 3,013,284 | 12/1961 | Crippin | 114—88 X |

MILTON BUCHLER, *Primary Examiner.*

FERGUS S. MIDDLETON, *Examiner.*